(12) United States Patent
Lok

(10) Patent No.: US 6,677,886 B1
(45) Date of Patent: Jan. 13, 2004

(54) WEATHER AND AIRBORNE CLUTTER SUPPRESSION USING A CLUSTER SHAPE CLASSIFIER

(75) Inventor: Yuchoi Francis Lok, Framingham, MA (US)

(73) Assignee: Raytheon Company, Lexington, MA (US)

(*) Notice: Subject to any disclaimer, the term of this patent is extended or adjusted under 35 U.S.C. 154(b) by 0 days.

(21) Appl. No.: 10/281,573

(22) Filed: Oct. 28, 2002

(51) Int. Cl.$^7$ ................................................. G01S 13/95
(52) U.S. Cl. ............................. 342/26; 342/92; 342/93; 342/159; 342/162
(58) Field of Search ............................... 342/26, 89, 90, 342/91, 92, 93, 159, 160, 161, 162, 195, 460

(56) References Cited

U.S. PATENT DOCUMENTS

| | | | |
|---|---|---|---|
| 5,351,045 A | * | 9/1994 | Cornman .................... 340/968 |
| 5,539,409 A | * | 7/1996 | Mathews et al. .............. 342/26 |
| 6,307,500 B1 | * | 10/2001 | Cornman et al. ............. 342/26 |
| 6,340,946 B1 | * | 1/2003 | Wolfson et al. ............... 342/26 |
| 6,260,759 B1 | * | 7/2003 | Nguyen et al. ............. 235/411 |

OTHER PUBLICATIONS

"An integrated weather channel designed for an up–to–date ATC radar system", Basile, M.; D'Addio, E.; Di Lazzaro, M.; Pasqua L.; Radar 92. International Conference, Oct. 12–13, 1992 P: 21–27.*

"Point process models for weather radar images", Larsen, M.; Geoscience and Remote Sensing Symposium, 1994 'Surface an Atmospheric Remote Sensing: Technologies, Data Analysis and Interpretation'.,Int', Vol: 1, Aug. 8–12, 1994 P: 25–28.*

"Non–Rayleigh scattering applied to hydrometeor size estimation", Sekelsky, S.M et al;Geoscience and Remote Sensing, 1997 'Remote Sensing—A Scientific Vision for Sustainable Development'., 1997 IEEE Int'l, Vol: 4, Aug. 3–8, 1997 P: 1753–1756.*

"An X–band solid–state FM–CW weather radar", Ligthart, L.P.; Nieuwkerk, L.R.; Radar and Signal Processing, IEE Proceedings, vol.: 137 Issue: 6, Dec. 1990 Page(s): 418–426.*

* cited by examiner

*Primary Examiner*—John B. Sotomayor
(74) *Attorney, Agent, or Firm*—Daly, Crowley & Mofford, LLP

(57) ABSTRACT

A method of determining the presence of a weather or other airborne (non-aircraft) clutter in a radar detection system is disclosed. The method includes feature calculations of a cluster of detections, and characterizing the cluster. Confidence factors are determined from the characterization of a cluster and a determination is made from the confidence factors whether the cluster represents a real aircraft or a false target.

24 Claims, 7 Drawing Sheets

WEATHER AND AIRBORNE CLUTTER SUPPRESSION USING A CLUSTER SHAPE CLASSIFIER

GOVERNMENT RIGHTS

This work was sponsored by the United States Army under Contract No. DAAB07-95-C-B001. The government has certain rights in this invention.

CROSS REFERENCE TO RELATED APPLICATIONS

Not Applicable.

FIELD OF THE INVENTION

The present invention relates generally to air traffic control radar systems and more specifically to a method of suppressing weather and other airborne clutter in radar results.

BACKGROUND OF THE INVENTION

It has traditionally been difficult to tune a radar system parameter for high sensitivity while still keeping the false alarm rate low. The source of false alarms could be from system noise, weather clutter, surface clutter or airborne clutter. Weather clutter is rain, snow or hail, and shows up in radar readings. False alarms due to weather clutter are problematic because they can appear in large number of tracks affecting most parts of the radar display. This may also be the time when the radar is mostly needed for air traffic control and navigation. The weather clutter distracts and confuses the air traffic controller and reduces the usefulness of the radar system.

Most radar systems utilize a Moving Target Indication (MTI) technique to eliminate airborne and ground clutter. This technique takes advantage of the fact that the Doppler velocity of airborne clutter is relatively low in comparison with the Doppler velocity of aircraft. The MTI technique uses this difference in Doppler velocity to distinguish between aircraft and airborne clutter. A drawback associated with the MTI technique is that the MTI technique is not sufficient to isolate slow helicopters from fast moving weather.

A radar reading may show one or more detection clusters which have been detected by the radar system. Each detection cluster represents an aircraft, ground clutter, airborne clutter or the like. Existing Airport Surveillance Radars (ASR) use only one of a detection cluster shape's dimensions, such as amplitude, to distinguish between aircraft and clutter. The determination method is usually a simple threshold comparison of the detection cluster shape's dimension to determine whether the detection cluster represents aircraft or weather clutter. Accordingly, known ASR systems have not been able to provide a high degree of sensitivity while still limiting the amount of false alarms.

In view of the foregoing it would be desirable to provide a method for determining the presence of airborne clutter and to distinguish the occurrence of non-aircraft airborne weather clutter from the detection of airborne vehicles while limiting the amount of false alarms.

SUMMARY OF THE INVENTION

With the foregoing background in mind, it is an object of the present invention to provide a method of determining the presence of an airborne clutter in a radar system. The method includes determining the presence of a detection cluster or detection clusters in a radar scan, and characterizing the detection cluster(s). Confidence factors are calculated from the characterization of a detection cluster and a determination is made from the confidence factor whether the detection cluster represents airborne clutter.

In accordance with another aspect of the present invention, a radar tracking system for determining the presence of airborne clutter is presented. The radar system includes a Doppler filter, a constant false-alarm rate (CFAR) circuit, a binary integrator, a plot extractor and a tracker. The plot extractor includes a detection cluster classifier which is utilized to whether detection clusters represent airborne clutter.

In accordance with another aspect of the present invention, a computer product is provided. The computer program product comprises a computer useable medium having computer readable program code embodied thereon with instructions for providing a method of determining the presence of a weather clutter in a radar detection system. The computer program product includes instructions for determining the presence of a detection cluster in a radar scan, and characterizing the detection cluster. The computer program product further includes instructions wherein confidence factors are determined from the characterization of a detection cluster and a determination is made from the confidence factors whether the detection cluster represents airborne clutter.

BRIEF DESCRIPTION OF THE DRAWINGS

The invention will be better understood by reference to the following more detailed description and accompanying drawings in which:

FIG. 8 is a radar display with the cluster classifier turned on.

DETAILED DESCRIPTION

Figure 1:
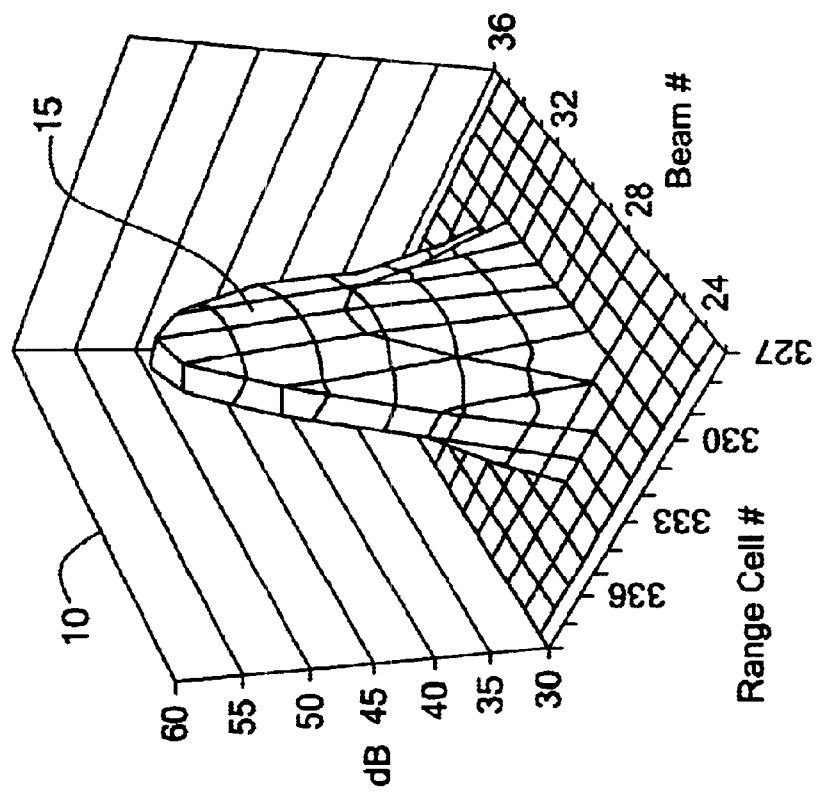
FIG. 1 is a graph of a three dimensional aircraft detection cluster.

It has been observed from return signals from radar scans that return signals from aircraft have different detection cluster shapes than return signals from airborne clutter. The range, angle and amplitude of return signals from a detection group form a three-dimensional detection cluster shape. In most cases, aircraft detection clusters have uniform shapes and are generally symmetric in range and angle. For example, graph 10 of a typical aircraft detection cluster 15 is shown in FIG. 1. A centerline of the detection cluster 15 is generally orthogonal to the radar beams.

Figure 2:
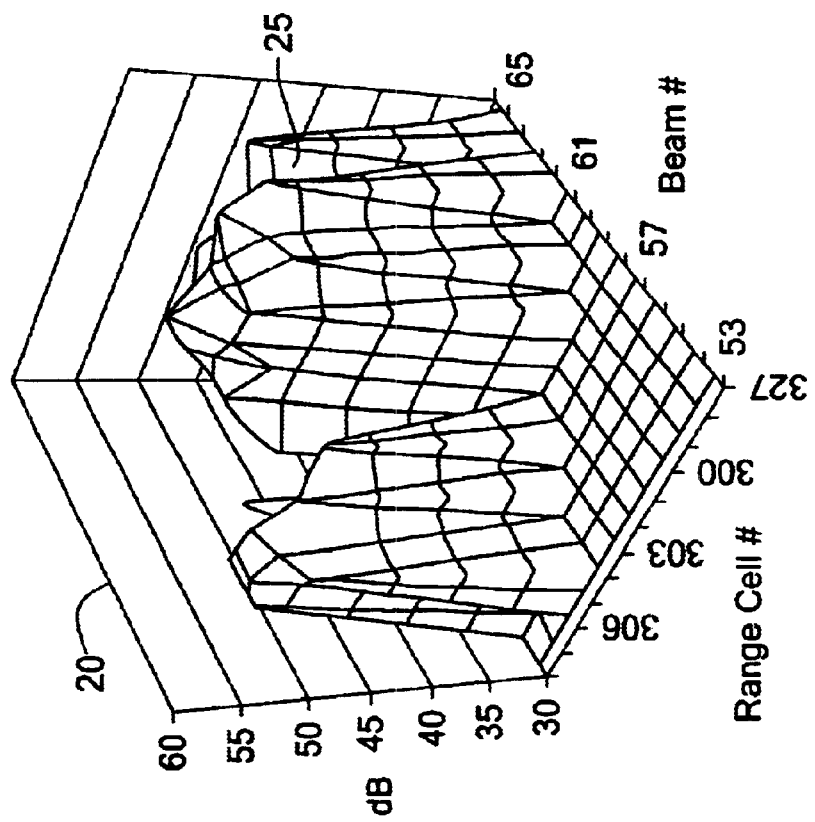
FIG. 2 is a graph of a three dimensional weather detection cluster.
Figure 3A:
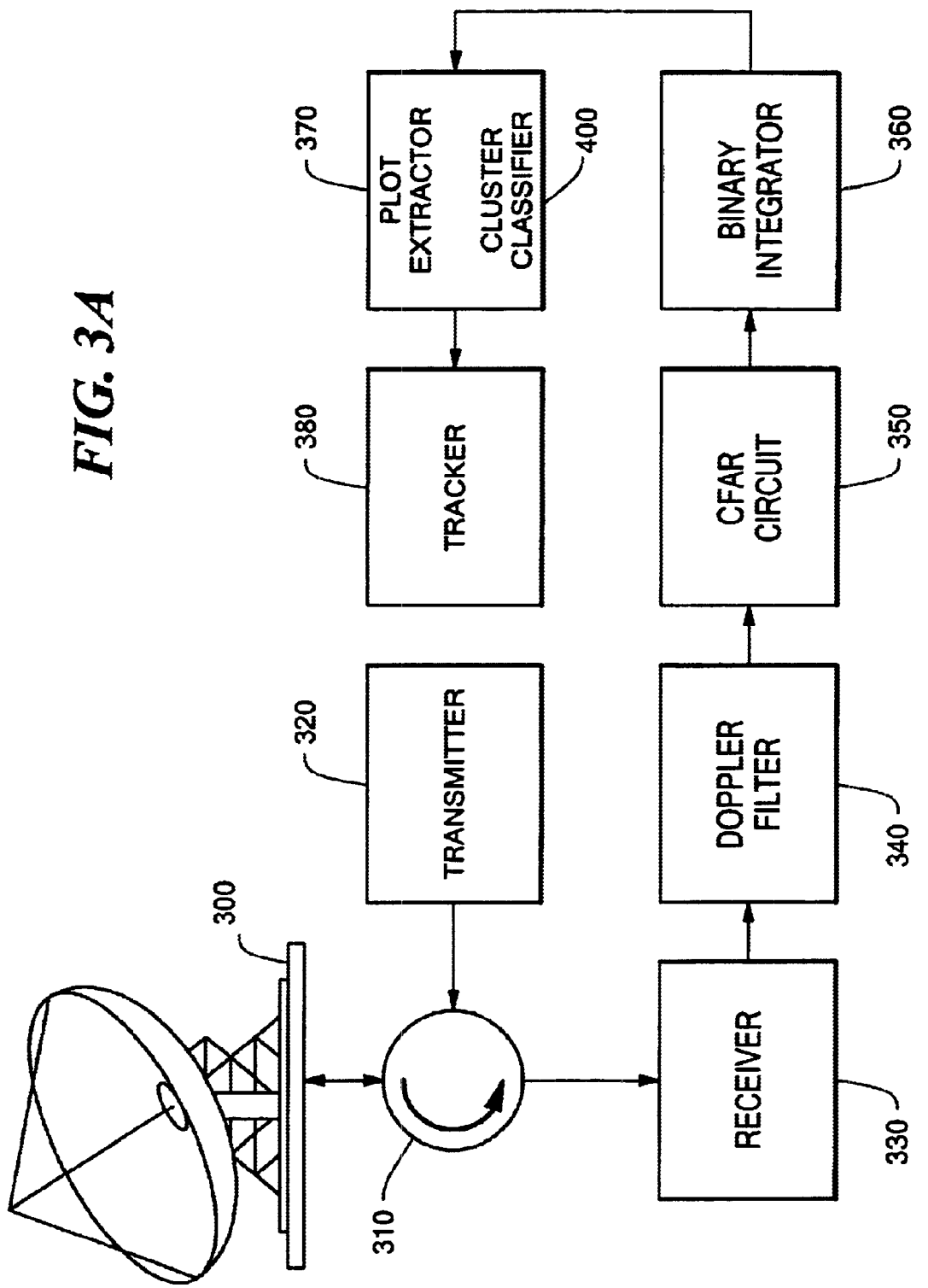
FIG. 3A is a block diagram of a radar system.
Figure 3B:
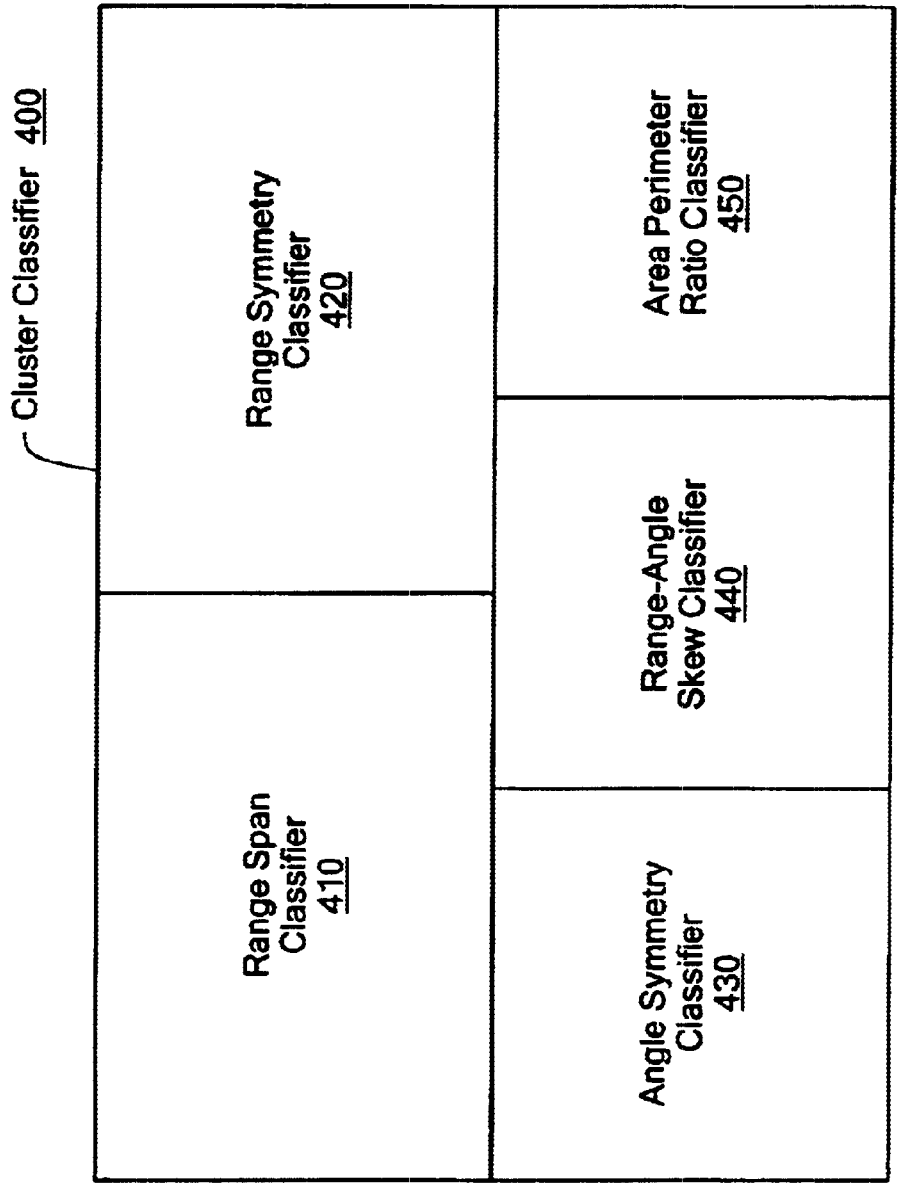
FIG. 3B is a block diagram of the detection cluster classifier of FIG. 3A.

Referring now to FIG. 2, a graph 20 of an airborne detection cluster 25 is shown. In contrast to the aircraft detection cluster 15 of FIG. 1, airborne detection cluster 25 has irregular edges and great variety of shapes. The graphs are provided from return signals resulting from a radar system. A radar system is shown in FIG. 3A. The radar system includes an antenna 300 used to transmit and receive signals. A duplexer 310 is coupled to the antenna 300, and receives signals from transmitter 320 and provides these signals to antenna 300. Duplexer 310 also receives signals from antenna 300 and provides these signals to receiver 330. After frequency down-conversion, the receiver digitizes the signals into one sample per range cell. A Doppler filter 340 is in communication with receiver 330 and filters the signals before providing the resultant signals to Constant False Alarm Rate (CFAR) circuitry 350. The CFAR circuitry compares the resultant signal to the calculated threshold. If the signal in a range cell is higher than the threshold, the CFAR circuitry 350 will send the signal of the range cell as a detection to the Binary Integrator 360. The Binary Integrator 360 groups detections of same range at adjacent radar beams. The output of the Binary Integrator 360 is provided to Plot Extractor 370. The Plot Extractor 370 forms a detection cluster from groups of detections of adjacent ranges. Each detection cluster is represented by a point, called plot, at the centroid of the detection cluster. Plot Extractor 370 includes a cluster classifier 400, shown in FIG. 3B and described in detail below. The output of the plot extractor is provided to Tracker 380.

The difference in detection cluster shapes of a non-aircraft airborne detection cluster as compared to an aircraft detection cluster led to the implementation of the cluster classifier 400 as part of the plot extractor 370. The cluster classifier 400 is used to eliminate non-aircraft airborne clutter related false tracks. The cluster classifier extracts features relating to the detected clusters and calculates confidence factors to indicate the likelihood of each detection cluster data being an aircraft detection cluster or a non-aircraft airborne detection cluster. The tracker 380 performs scan-to-scan association and determines whether to report or drop a track based on the accumulated confidence factors.

Figure 4:
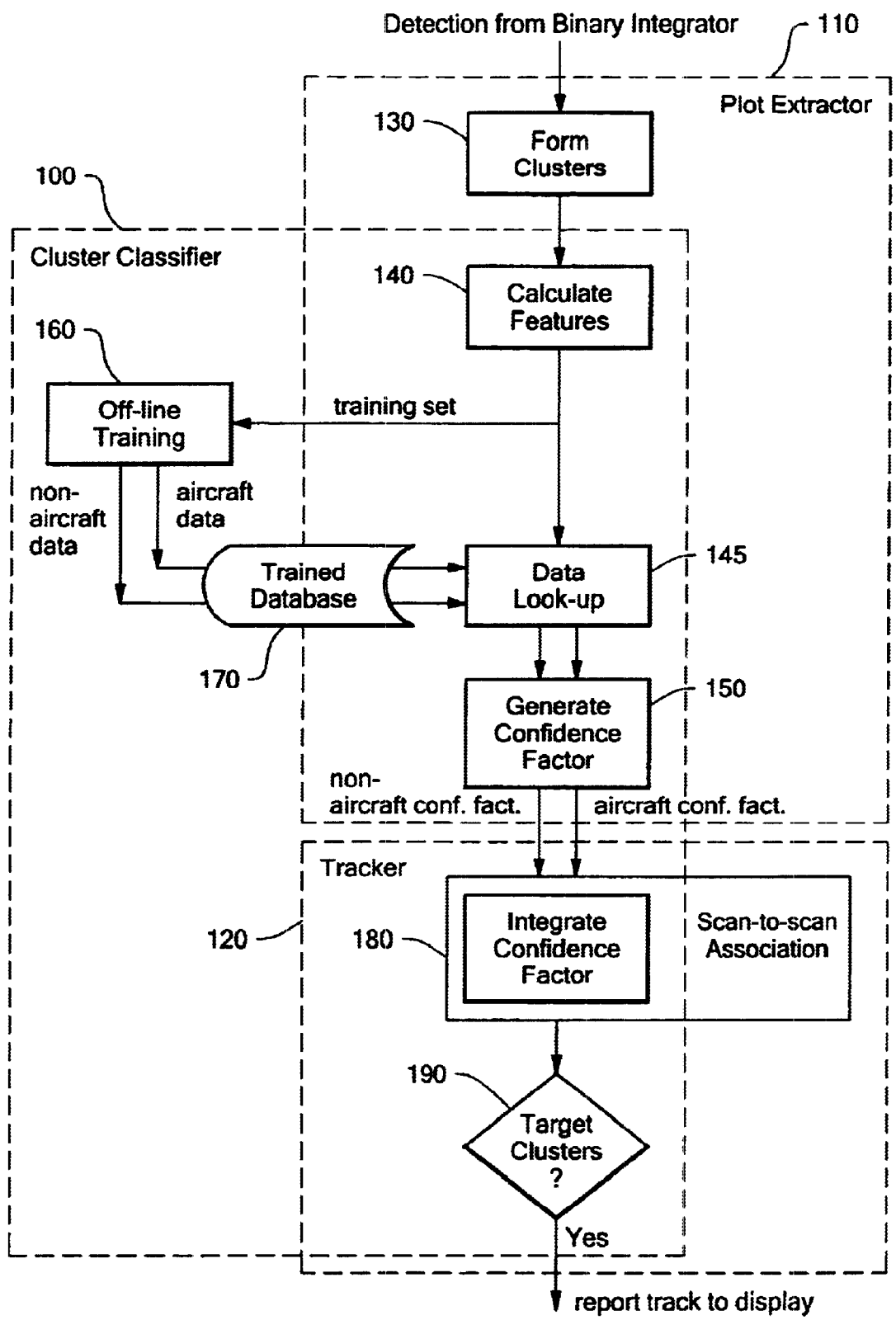
FIG. 4 is a flow chart of the method of the present invention.

A combination flow chart and block diagram of the presently disclosed method is depicted in FIG. 4. The rectangular elements are herein denoted "processing blocks" and represent computer software instructions or groups of instructions. The diamond shaped elements, are herein denoted "decision blocks," represent computer software instructions, or groups of instructions which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 4, a combination flow chart and block diagram of the presently disclosed invention 100 is shown. Method 100 is an integral part of the Plot Extractor 370 and Tracker 380. The first step of the method, step 110 provides detection information from the Binary Integrator. The next step, step 130, gathers detection from Binary Integrator to form clusters of detection. Each detection cluster formed in step 130 is characterized. The characterization of the detection cluster takes place during step 140 and is described below.

In order to properly characterize a detection cluster shape, the width, height, area, symmetry, orientation and edge smoothness are calculated.

The first feature considered in performing step 140 is Range Span measurement. This feature is measured by the Range Span Classifier 410 of Cluster Classifier 400 shown in FIG. 3B. While the Cluster Classifier 400 is shown as a group of blocks, the blocks may represent hardware, software or combinations of hardware and software in order to provide the desired function. The range span is measured as the range difference between the farthest cell (to the radar) and the nearest cell of a detection cluster. Aircraft typically have a range span of 2 to 3 times less than a weather cluster.

A second feature used in step 140 is the determination of Range Symmetry which is measured as the range variance of the detection cluster. This feature is measured by the Range Symmetry Classifier 420 of Cluster Classifier 400 shown in FIG. 3B. The range variance of a point source target should be the same as the transmitted pulse shape. If there are scattered reflecting surfaces as in the case of precipitation, the received pulse shape will be wider and the range variance will be larger. Range Symmetry is determined from the formula:

$$R_{sym} = \Sigma\{A_i R_i^2\}/\Sigma\{A_i\} - R^2$$

where $A_i$ is the log-amplitude of cell i;

$R_i$ is the range of cell i; and

R is the mean range of the cluster $\Sigma\{A_i R_i\}/\Sigma\{A_i\}$

A third feature measured as part of step 140 comprises measuring Angle Symmetry. Angle Symmetry is measured as the angular variance of the detection cluster. This feature is measured by the Angle Symmetry Classifier 430 of Cluster Classifier 400 shown in FIG. 3B. Similar to the Range Symmetry, the Angle Symmetry is proportional to the radar beam shape and is independent of signal amplitude.

A fourth feature considered as part of the detection cluster classification of step 140 is known as Range-Angle Skew. This feature is measured by the Range-Angle Skew Classifier 440 of Cluster Classifier 400. The measurement of this feature is zero if the centerline of the detection cluster is orthogonal to the radar beam. An angular asymmetric and/or range asymmetric detection cluster could still have zero range-angle skew. These feature properties are independent. Range-Angle skew is determined by application of the formula:

$$RA_{skew} = \Sigma\{A_i R_i \theta_i\}/\Sigma\{A_i\} - RO$$

Where $\theta_i$ is the angular position of cell i with respect to the radar system; and O is the mean angle of the detection cluster $\Sigma\{A_i \theta_i\}/\Sigma\{A_i\}$.

Figure 5:
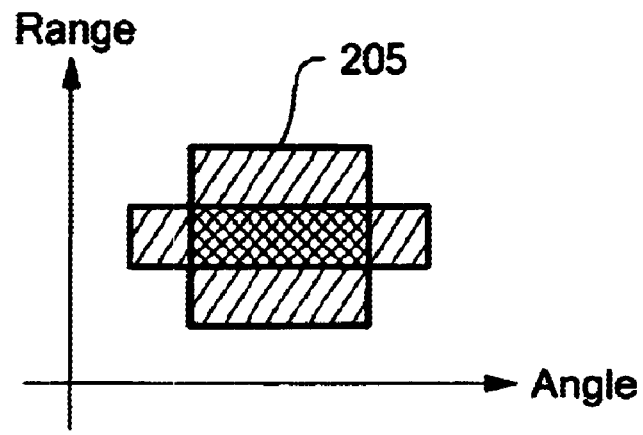
FIG. 5 is a graph of a typical aircraft cluster.
Figure 6:
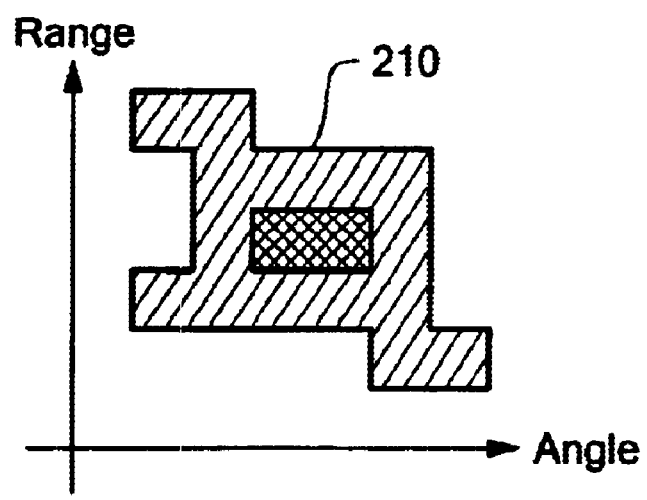
FIG. 6 is a graph of a typical weather cluster.

A fifth feature used in the detection cluster characterization step 140 comprises an Area Perimeter Ratio. This feature is measured by the Range Perimeter Ratio Classifier 450 of Cluster Classifier 400. The Area Perimeter Ratio is the ratio between the total number of cells of the detection cluster and the number of cells marked as an edge. A cell is marked as an edge if one of its four adjacent cells (top, bottom, left and right) is not present. A weather detection cluster typically has a smaller Area Perimeter Ratio than an aircraft detection cluster because of the rough edges typically found in a weather detection cluster. This can be seen in FIG. 5 (detection cluster 205) and FIG. 6 (detection cluster 210).

Referring now back to FIG. 4, at step 150 the cluster classifier generates confidence factors based on the prior statistics of the aircraft and non-aircraft features. Some data files have been set aside and the feature samples are extracted as the training set, represented by elements 160 and 170. Each feature measurement is quantified into a fixed number of bins. The frequency of occurrence of the feature in each bin is counted. This can be done offline separately, step 160, for aircraft and non-aircraft data. This trained database 170 is embedded in the real-time software and is used for lookup of the probability values, step 145, using the calculated values. The probability values are scaled and offset according to the sample size to generate the Confidence Factors. This scaling and offset of the probability value is necessary, as the sample size from the prior statistics in the trained database may not show enough evidence for decision. The offset values are approximately fifty percent for aircraft and fifty percent for non-aircraft. In the case of no data sample in the database, the confidence factor will be 50/50.

Following step 150, step 180 integrates the aircraft Confidence Factor and non-aircraft Confidence Factor scan by scan for cluster corresponding to each track. When a track is formed, step 190 compares the Confidence Factors. If the non-aircraft Confidence Factor is greater than the aircraft confidence factor, the track with the corresponding detection cluster is determined as non-aircraft. When it is determined by the cluster classifier that the track does in fact comprise weather or non-aircraft clutter, the track is removed from the report to the display as shown in step 194. When it is determined that the track is aircraft, then the track is reported to the display, as shown in step 192. Following steps 192 or 194 the process ends.

Offline testing against an independent data set was conducted. The data contains targets of opportunity similar to the training set. The data has aircraft of various types, velocities, orientations and locations. Some data could be at the edge of radar coverage or into high clutter region. When the Range Span feature comprises only one cell, there is not enough information for proper classification and the result is declared as Unknown. The following results are based on the comparisons of Confidence Factors in each radar scan and there is no correlation between scans.

| | Input | |
|---|---|---|
| Output | Aircraft | Weather |
| Aircraft | 85% | 18% |
| Weather | 7% | 52% |
| Unknown | 8% | 30% |

Offline testing against an untrained data set was also performed. The training set contained no helicopter, formation flight nor birds. The birds could be clutter due to anomalous propagation (AP) and could not be positively identified. The following results show the Cluster Classifier performs well with helicopters and birds/AP.

| | Input | | |
|---|---|---|---|
| output | Helicopters | Formation flight | Birds/AP |
| Aircraft | 85% | 47% | 26% |
| Weather | 9% | 37% | 15% |
| Unknown | 6% | 16% | 58% |

Figure 7:
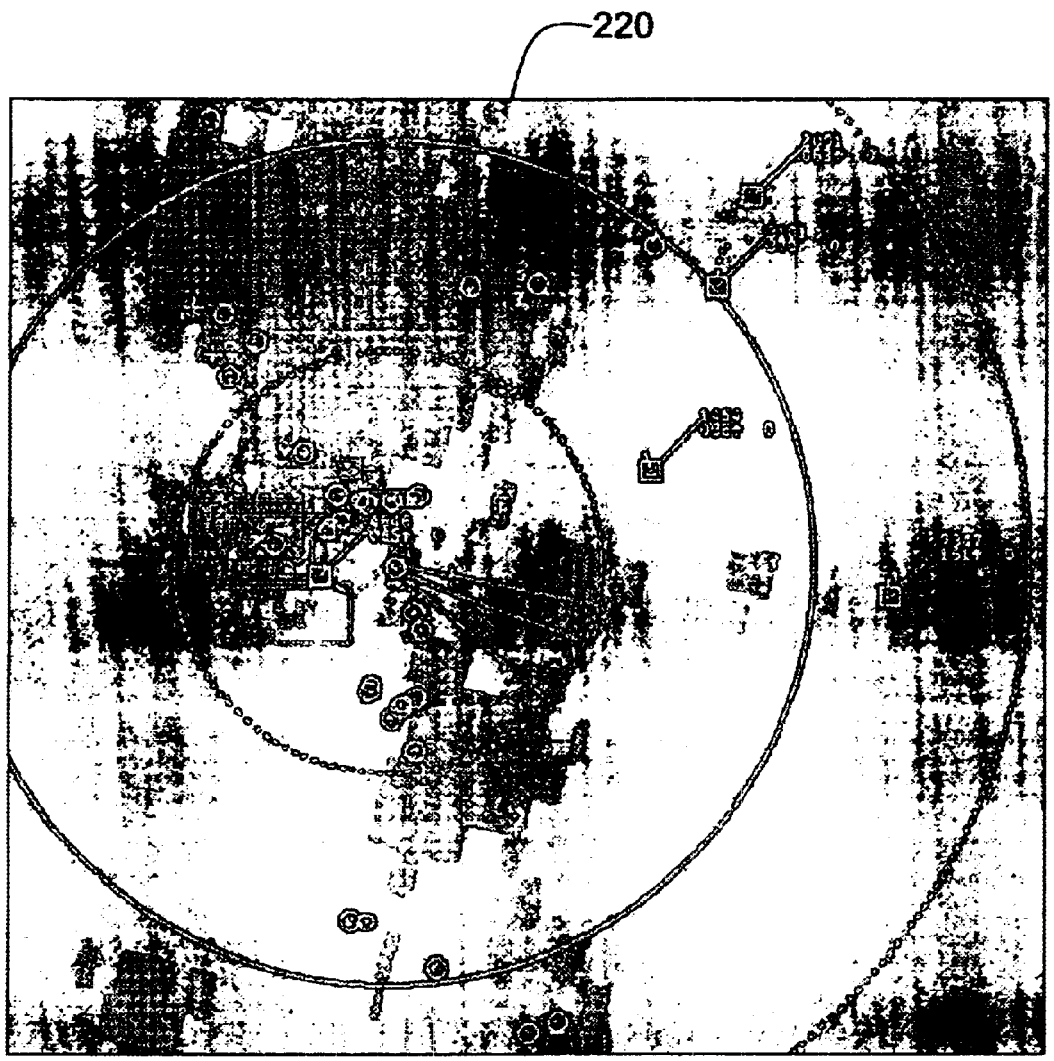
FIG. 7 is a radar display with the cluster classifier turned off.
Figure 8:
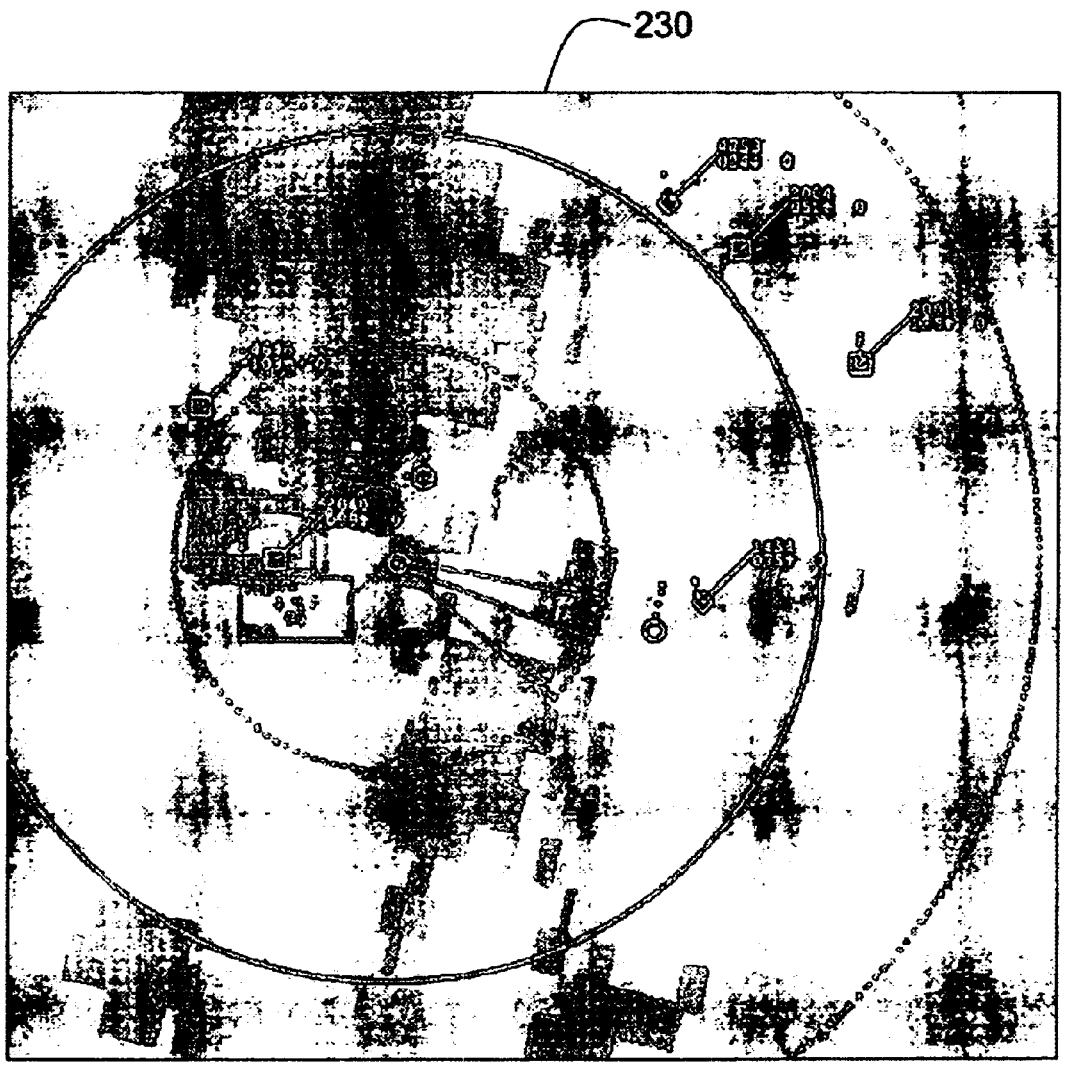

Real-time testing was performed as well. This test shows the results of accumulated Confidence Factors by the Tracker. It is difficult to have quantitative results because the length of each track history is different. The radar displays of FIGS. 7 and 8 were taken during a storm. In FIGS. 7 and 8 the diamond shape symbols are SSR only tracks, the circular track symbols are ASR only tracks, and the square track symbols are ASR/SSR combined tracks. The scan in FIG. 7 was taken with the Cluster Classifier turned off. Many of the ASR only tracks are in the weather region and are most likely weather clutters. The scan in FIG. 8 was taken a few minutes later with the Cluster Classifier turned on. All the suspected weather clutters disappeared.

The cluster classifier was implemented in two radar systems of different frequency bands, beam widths, and range resolutions. Both radar systems showed significant improvement with respect to the weather clutter problem. The processing power requirement is negligible in compare with the total software for signal and data processing.

As discussed above, a method of determining the presence of a weather clutter in a radar detection system has been described. The method includes determining the presence of a detection cluster in a radar scan, and characterizing the detection cluster. Confidence factors are determined from the characterization of a detection cluster and a determination is made from the confidence factors whether the detection cluster represents a weather clutter.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method of determining a presence of non-aircraft clutter in a radar system comprising:
    determining the presence of a cluster in a radar scan;
    characterizing said cluster;
    calculating at least one confidence factor based on said characterizing of said cluster; and
    determining from said at least one confidence factor whether said cluster represents non-aircraft clutter.

2. The method of claim 1 wherein said characterizing step includes determining at least one characteristic of a cluster, said characteristic including at least one of a range span of said cluster, a range symmetry of said cluster, an angle symmetry of said cluster, a range-angle skew of said cluster, and an area perimeter ratio of said cluster.

3. The method of claim 2 wherein said range span is measured as the range difference between the farthest cell and the nearest cell of a cluster.

4. The method of claim 2 wherein said range symmetry is measured as the range variance of the detection cluster.

5. The method of claim 2 wherein said angle symmetry is measured as the angular variance of the detection cluster.

6. The method of claim 2 wherein said determining a range-angle skew is performed in accordance with the formula $RA_{skew} = \Sigma\{A_i R_i \theta_i\}/\Sigma\{A_i\} - RO$ where $\theta_i$ is the angular position of cell i, and O is the mean angle of the cluster $\Sigma\{A_i \theta_i\}/\Sigma\{A_i\}$.

7. The method of claim 2 wherein said area perimeter ratio is the ratio between the total number of cells of the cluster and the number of cells marked as edge.

8. The method of claim 4 wherein said determining a range symmetry is performed in accordance with the formula $R_{sym} = \Sigma\{A_i R_i^2\}/\Sigma\{A_i\} - R^2$ where $A_i$ is the log-amplitude of cell i, $R_i$ is the range of cell i, and R is the mean range of the cluster $\Sigma\{A_i R_i\}/\Sigma\{A_i\}$.

9. A computer program product comprising a computer usable medium having computer readable code thereon for determining the presence of non-aircraft clutter in a radar system comprising:

instructions for determining the presence of a cluster in a radar scan;

instructions for characterizing said cluster;

instructions for calculating at least one confidence factor based on said characterizing of said cluster; and instructions for determining from said at least one confidence factor whether said cluster represents a non-aircraft clutter.

10. The computer program product of claim 9 wherein said instructions for characterizing includes instructions for determining at least one characteristic of a cluster, said characteristic including at least one of a range span of said cluster, a range symmetry of said cluster, an angle symmetry of said cluster, a range-angle skew of said cluster, and an area perimeter ratio of said cluster.

11. The computer program product of claim 10 wherein said range span is measured as the range difference between the farthest cell and the nearest cell of a cluster.

12. The computer program product of claim 10 wherein said range symmetry is measured as the range variance of the detection cluster.

13. The computer program product of claim 10 wherein said angle symmetry is measured as the angular variance of the detection cluster.

14. The computer program product of claim 10 wherein said determining a range-angle skew is performed in accordance with the formula $RA_{skew} = \Sigma\{A_i R_i \theta_i\}/\Sigma\{A_i\} - RO$ where $\theta$ is the angular position of cell i, and O is the mean angle of the cluster $\Sigma\{A_i \theta_i\}/\Sigma\{A_i\}$.

15. The computer program product of claim 10 wherein said area perimeter ratio is the ratio between the total number of cells of the cluster and the number of cells marked as edge.

16. The computer program product of claim 12 wherein said determining a range symmetry is performed in accordance with the formula $R_{sym} = \Sigma\{A_i R_i^2\}/\Sigma\{A_i\} - R^2$ where $A_i$ is the log-amplitude of cell I, $R_i$ is the range of cell I, and R is the mean range of the cluster $\Sigma\{A_i R_i\}/\Sigma\{A_i\}$.

17. A radar tracking system comprising:

at least one Doppler filter;

a constant false-alarm rate (CFAR) circuit in communication with said at least one Doppler filter;

a binary integrator in communication with said CFAR circuit;

a plot extractor in communication with said binary integrator, said plot extractor including a cluster classifier; and a tracker in communication with said plot extractor.

18. The system of claim 17 wherein said cluster classifier comprises a range span classifier to provide a range span of said cluster, a range symmetry classifier to provide a range symmetry of said cluster, an angle symmetry classifier to provide an angle symmetry of said cluster, a range-angle skew classifier to provide a range-angle skew of said cluster, and an area perimeter ratio classifier to provide an area perimeter ratio of said cluster.

19. The system of claim 18 wherein said range span is measured as the range difference between the farthest cell and the nearest cell of a cluster.

20. The system of claim 18 wherein said range symmetry is measured as the range variance of the detection cluster.

21. The system of claim 18 wherein said angle symmetry is measured as the angular variance of the detection cluster.

22. The system of claim 18 wherein said range-angle skew is determined in accordance with the formula $RA_{skew} = \Sigma\{A_i R_i \theta_i\}/\Sigma\{A_i\} - RO$ where $\theta$ is the angular position of cell i, and O is the mean angle of the cluster $\Sigma\{A_i \theta_i\}/\Sigma\{A_i\}$.

23. The system of claim 18 wherein said area perimeter ratio is the ratio between the total number of cells of the cluster and the number of cells marked as edge.

24. The system of claim 20 wherein said range symmetry is determined in accordance with the formula $R_{sym} = \Sigma\{A_i R_i^2\}/\Sigma\{A_i\} - R^2$ where $A_i$ is the log-amplitude of cell i, $R_i$ is the range of cell i, and R is the mean range of the cluster $\Sigma\{A_i R_i\}/\Sigma\{A_i\}$.

* * * * *

UNITED STATES PATENT AND TRADEMARK OFFICE
CERTIFICATE OF CORRECTION

PATENT NO. : 6,677,886 B1
DATED : January 13, 2004
INVENTOR(S) : Lok

It is certified that error appears in the above-identified patent and that said Letters Patent is hereby corrected as shown below:

Column 1,
Line 57, delete "the foregoing it" and replace it with -- the foregoing, it --.

Column 2,
Line 13, delete "utilized to whether" and replace it with -- utilized whether --.

Column 3,
Line 62, delete "stated the" and replace it with -- stated, the --.

Column 5,
Line 36, delete "does in fact" and replace it with -- does, in fact, --.
Line 38, delete "displaying as" and replace it with -- display, as --.

Column 6,
Line 16, delete "8 the" and replace it with -- 8, the --.
Line 29, delete "in compare" and replace it with -- in comparison --.
Line 39, delete "the invention" and replace it with -- the invention, --.
Line 52, delete "that that the" and replace it with -- that the --.

Column 8,
Line 3, delete "$\Sigma\{A_I\theta_I\}/\Sigma\{A_I\}$" and replace it with -- $\Sigma\{A_i\theta_i\}/\Sigma\{A_i\}$ --.

Signed and Sealed this

Twenty-eighth Day of February, 2006

JON W. DUDAS
*Director of the United States Patent and Trademark Office*